Patented Aug. 31, 1937

2,091,309

UNITED STATES PATENT OFFICE 2,091,309

RECOVERY OF SULPHURIC ACID IN SACCHARIFICATION PROCESS

Henry Dreyfus, London, England

No Drawing. Application April 16, 1935, Serial No. 16,624. In Great Britain April 20, 1934

5 Claims. (Cl. 23—172)

This invention relates to the saccharification of cellulose, and is more particularly concerned with the recovery of sulphuric acid used in such saccharification.

According to the present invention saccharification liquors produced in the treatment of cellulose, or wood, straw, grasses or other cellulose-containing materials with sulphuric acid are treated with ferric oxide, and the ferric sulphate thus produced is separated from the liquor and decomposed by the action of heat to produce sulphur trioxide. By absorbing, for instance in diluted sulphuric acid, the sulphur trioxide thus obtained, sulphuric acid is reconstituted and the loss of acid obtaining in processes in which lime, chalk or the like is employed to neutralize the acid is largely avoided.

The present invention is particularly applicable to processes in which the cellulose or cellulose-containing material is first dissolved in strong sulphuric acid of, for example, 70 to 90% concentration, and the solution thus obtained is diluted and heated, e. g. to 100 to 120° C. usually under super-atmospheric pressure to effect the saccharification of the intermediate product produced by the initial solution step. Thus, in such processes the intermediate solution may be diluted so that the product contains acid of a concentration of about 3 to 5% down to 2% or less. By leaving acid of a concentration higher than 2%, and preferably higher than 3%, the time taken for the treatment with the ferric oxide may be shortened whilst still effecting an efficient hydrolysis of the products obtained by the preliminary solution step.

The invention may, however, be applied to processes in which the cellulose is transformed into sugars as a result of a single treatment with sulphuric acid, usually of ½% or less to 2% concentration at temperatures of about 150 to 180° C. and under suitable super-atmospheric pressures. Here again the acid may be employed in more concentrated solution, if desired in conjunction with lower temperatures of treatment.

The ferric oxide may be employed in hydrated form, i. e. in the form of ferric hydroxide, as it is then more rapidly dissolved by the acid.

The saccharification liquor may be heated or boiled with the ferric oxide, the latter preferably being employed in excess.

When no more oxide will dissolve the solution is cooled, and the sulphate formed, which is mainly basic ferric sulphate, is separated by filtering or decanting or like operations, and after removal of excess liquor by centrifuging, is decomposed by heating, the sulphur trioxide evolved being absorbed, e. g. in diluted sulphuric acid, to re-form sulphuric acid preferably in concentrated form, which may be used again for the treatment of fresh batches of cellulose-containing materials.

The heating of the ferric sulphate need not be prolonged until all the sulphur trioxide is freed from combination with iron, and in practice heating may be stopped as soon as a substantial diminution in the rate of evolution of sulphur trioxide becomes apparent. This heating can conveniently be effected by feeding the ferric sulphate by means of a hopper down a flue heated externally, e. g. by combustion of producer or like gases or by oil burners, up which flue a current of air is drawn by a fan working in a gas outlet near the top thereof. The residue (consisting mainly of ferric oxide) obtained by the action of heat upon the ferric sulphate is withdrawn from a hearth at the base of the flue, fresh sulphate being fed into the flue from the hopper. By suitable adjustment of the rate of removal of the treated material from the hearth, and its replacement by fresh sulphate, conditions can be arranged so that in its travel through the flue the sulphate loses as much sulphur trioxide as is desired.

The ferric oxide obtained by the heat treatment, which is usually mixed with a small quantity of sulphate, can be again employed for treating further saccharification liquor. Before being so used, it may be subjected to the action of steam to aid solution of the ferric oxide in the acid of the saccharification liquor by breaking up aggregates of the material and by hydrating the oxide.

While the invention has been described with particular reference to the use of ferric oxide, it should be noted that oxides of other metals forming sulphates which yield sulphur trioxide under the action of heat, for example cupric oxide, may be employed similarly, and the invention includes the use of such other oxides as well as mixtures, for example mixtures of ferric and cupric oxides.

The following example illustrates the invention, but it is to be understood that this example is given solely by way of illustration and is in no way limitative:—

Example

To a hot saccharification liquor contained in a vessel provided with a stirrer and containing about 3% sulphuric acid, hydrated ferric oxide is added in the proportion of 300 parts by weight to 10,000 parts of liquor.

After an hour to 1½ hours the liquor is cooled, and the sulphate formed is separated and freed from liquor by centrifuging, after which it is decomposed by being heated in a current of air until the evolution of sulphur trioxide practically ceases. On leaving the decomposition vessel the current of air containing sulphur trioxide is passed into sulphuric acid to absorb the sulphur trioxide. The sulphuric acid may be maintained at a concentration suitable for efficient absorption, e. g. 97-98%, by addition of water during the absorption, or may be allowed to form oleum to be diluted subsequently, e. g. to a concentration suitable for saccharifying cellulosic materials.

The residue obtained from the decomposition of the sulphate, and which consists mainly of ferric oxide containing a little sulphate, is subjected to the action of steam to hydrate the oxide present and to break up agglomerates, after which it may be used for the treatment of a further quantity of saccharification liquor.

What I claim and desire to secure by Letters Patent is:—

1. A manufacture of saccharification products of cellulose, which comprises saccharifying cellulosic material by means of sulphuric acid and recovering the sulphuric acid radicle from the solution containing the saccharification products, in the form of a metal sulphate which, on heating alone, yields sulphur trioxide.

2. A manufacture of saccharification products of cellulose, which comprises saccharifying cellulosic material by means of sulphuric acid and recovering the sulphuric acid radicle, in the form of ferric sulphate, from the solution containing the saccharification products.

3. A manufacture of saccharification products of cellulose, which comprises saccharifying cellulosic material by means of sulphuric acid, recovering the sulphuric acid radicle, in the form of ferric sulphate, from the solution containing the saccharification products, decomposing the ferric sulphate by the action of heat and absorbing sulphur trioxide thus produced in aqueous sulphuric acid.

4. A manufacture of saccharification products of cellulose, which comprises saccharifying cellulosic material by means of sulphuric acid, recovering the sulphuric acid radicle, in the form of ferric sulphate, from the solution containing the saccharification products, decomposing the ferric sulphate by the action of heat to produce sulphur trioxide, hydrating the residue from the decomposition by treatment with steam and employing the hydrated product for recovering sulphuric acid.

5. A manufacture of saccharification products of cellulose, which comprises saccharifying cellulosic material by means of sulphuric acid, recovering the sulphuric acid radicle, in the form of ferric sulphate, from the solution containing the saccharification products, decomposing the ferric sulphate by the action of heat, absorbing sulphur trioxide thus produced in aqueous sulphuric acid, hydrating the residue from the decomposition by treatment with steam, and employing the hydrated product for recovering further sulphuric acid.

HENRY DREYFUS.